(12) United States Patent
Prieto Barranco et al.

(10) Patent No.: US 7,895,891 B2
(45) Date of Patent: Mar. 1, 2011

(54) GAS/LIQUID SEPARATOR COMPRISING A CAPACITIVE LEVEL SENSOR

(75) Inventors: Jose Prieto Barranco, Madrid (ES); Consuelo Goberna Selma, Madrid (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 83 days.

(21) Appl. No.: 11/628,340

(22) PCT Filed: Jun. 2, 2005

(86) PCT No.: PCT/ES2005/070081
§ 371 (c)(1), (2), (4) Date: Jun. 25, 2007

(87) PCT Pub. No.: WO2006/021604
PCT Pub. Date: Mar. 2, 2006

(65) Prior Publication Data
US 2007/0283753 A1    Dec. 13, 2007

(30) Foreign Application Priority Data
Jun. 3, 2004    (ES) .................................. 200401349

(51) Int. Cl.
*G01F 23/26*    (2006.01)
(52) U.S. Cl. .................................... 73/304 C
(58) Field of Classification Search .................... 73/304; 307/118
See application file for complete search history.

(56) References Cited

U.S. PATENT DOCUMENTS

| | | | | |
|---|---|---|---|---|
| 2,186,842 A | * | 1/1940 | Scoville | 361/274.2 |
| 4,470,300 A | * | 9/1984 | Kobayashi | 73/304 |
| 4,506,510 A | * | 3/1985 | Tircot | 62/3.4 |
| 6,272,906 B1 | * | 8/2001 | Fleury et al. | 73/64.55 |

* cited by examiner

*Primary Examiner* — Hezron Williams
*Assistant Examiner* — Alex Devito
(74) *Attorney, Agent, or Firm* — Wenderoth, Lind & Ponack, L.L.P.

(57) ABSTRACT

The invention relates to a gas/liquid separator comprising a capacitive level sensor, which is particularly suitable for systems that employ reduced volumes of fluids at high pressures. The inventive separator includes a metal part comprising a borehole which is closed at the lower end thereof, such as to form a container. The aforementioned container comprises at least one gas inlet, one liquid outlet and one gas outlet. A cooling system in the form of a Peltier cell that is in contact with the walls of the metal part, generates the condensation of the liquid which is collected at the bottom of the container until the introduction of a probe, which is electrically isolated from the system and which forms an electric condenser with the walls of the part. The capacity of the condenser varies according to the level of liquid in the container. In addition, a frequency signal is generated by means of an oscillator output signal that is proportional to the response from the sensor and, consequently, the height of the liquid in the container.

7 Claims, 4 Drawing Sheets

GAS/LIQUID SEPARATOR COMPRISING A CAPACITIVE LEVEL SENSOR

FIELD OF THE INVENTION

The present invention relates to a capacitive level sensor, which is particularly suitable for systems that employ reduced volumes, for example in pilot plants or at the laboratory level, where the size of the instruments and the measurement range entail limitations when using the currently-existing measuring devices.

BACKGROUND OF THE INVENTION

For the level measurement in an industrial environment, highly widely-varied physical principals are currently being used. Factors such as the corrosivity or the flammability of the substances to be measured or the extreme pressure and temperature conditions will have a bearing on the type of measuring device selected, as well as on the precision, reliability and physical limitations of the system. In the aforementioned selection of the type of measuring device, the static measuring devices are preferred over those composed of moving parts and those not requiring any contact with the fluid or which are even external to the system. However, industry has focused its efforts on level reading in large containers.

Although there are a great many operating principles upon which the different level measuring devices currently on the market are based (flotability, ultrasound, conductivity, laser, differential pressure, resistivity, capacity, microwaves, radioactivity, deformation, etc.), in the environment of a pilot micro-plant or laboratory reactor scale, basically any type of instrument for level measuring is ruled out as a result of the installation-related limitation stemming from the size of the instruments in some cases and from the measurement range intended to be achieved in others. The only valid method for the measurement thereof in these systems is the indirect measurement by means of the differential pressure existing between the top and bottom of a container which results from the pressure exerted on the base thereof by the hydrostatic column:

$$P = \rho \cdot g \cdot h$$

Focusing the current situation of the available technology in the application thereof to the type of systems being dealt with herein, it can be said that there is no level-measuring instrument on the market which can satisfactorily provide this measurement given the size-related specifications the control thereof requires in a continuously-operating laboratory reactor.

Thus, for example, a container where condensation of the liquid reaction byproducts takes place at the outlet of a reactor must avail itself of a continuos level measurement for the purpose of adjusting the outflow of liquids from the reactor, a phenomenon which occurs at high pressures in this container, i.e., on the order of 100 bar. Condensation occurs continuously, and if prevention of the accumulation of these products is intended for the purpose of making the analysis of samples in certain reaction times possible, the situation should be as close as possible to "drop that condenses, drop that is evacuated form the system". To this end, it is absolutely essential to keep a constant level, which also serves as a hydraulic seal of the system.

There are currently different builders of these types of systems that use the pressure differential measurement in the container as an indirect level measurement thereof. Generally speaking, this is a matter of two branches, an upper and a lower branch, which capture the different pressure between the ends of the container. But with this system, the fluid column must be kept several centimeters in height above the high pressure-reading branch due to the precision of these systems and to their zero error, choosing an insufficient height could be critical if the zero error were to mask the transmitter signal and the control system were to receive a wrong signal. Were this phenomenon to occur, the control valve which regulates the height of this fluid column would tend to open until it evacuated the liquid from the container, at which point the hydraulic seal would be lost, and the gasses from the system would flow to the outside, possibly causing an accident due to their toxicity or flammability.

If one adds to the above the liquid column which must fill the branch which transmits the pressure to the measuring device and the amount of liquid which must fill the chamber of the reading instrument, a design with a considerable dead volume would have to be made, which, in a situation in which the system is supplied with a small flow rate of liquids, on the order of 0.01 ml/min, it would take a considerable length of time, even several hours, to achieve the first drop of sample of liquid at the outlet.

This is avoided by keeping a liquid inundating the system constantly, which contaminates the sample. In any event, it is inevitable that the sample at the outlet be a measurement of the products collected throughout a long period of time. The situation is not critical at large-scale pilot plants, where the flow rates are considerably higher and these effects are negligible, but it is definitively unacceptable in reactors which work with very small volumes, such as is the case, for example, of the catalytic microactivity studies, pilot plants under supercritical conditions with backflow column, agitated autoclaves of volumes ranging from 50 to 1000 ml, and other small-volume systems.

SUMMARY OF THE INVENTION

The capacitive level sensor the invention proposes provides a satisfactory solution to the problems discussed hereinabove, in the different aspects commented upon, given that it is specially-designed for its application in systems where work is done with microvolumes.

Therefore, it is an object of the invention is to provide a sensor for the level measurement in Microsystems, the sensor working with practically zero dead volumes and which makes it possible to work at high pressures, even for systems under supercritical conditions, achieving precise linear responses in the measurements thereof.

The proposed invention, for example in an application such as a low dead volume liquid/gas separator will be comprised of a capacitive level sensor, incorporating a liquid/gas separator. The separator is in the form of a metal part, preferably solid stainless steel, into which a hole has been drilled lengthwise, which comprises a container, as well as other machines corresponding to the inlet and outlets of the gas and liquid systems. Through the top of this opening, a probe is inserted which is electrically isolated from the rest of the system by means of preferably elastomeric, chemically compatible closures capable of withstanding high pressures.

The aforementioned solid part is preferably configured in parallelepiped form, which makes cooling of the solid part possible, as a result of which the solid part serves as a condenser, for which purpose it has a cooling system incorporated, for example a Peltier cell, which will remain in contact with the metal casing.

The container of the parallelepiped part allows the liquids to condense on its walls at high pressure and at a temperature of −2° C. to 20° C., the condensed liquids being collected in the base thereof, up to which point the probe is inserted, which, being electrically isolated from this container, becomes one of the plates of an electric condenser.

It is important to point out that the system comprising the probe is equipped with a number of pieces of insulating material, preferably polytetrafluoroethylene, which in addition to guiding the assembly, eliminate the dead volumes from the system.

The device has at least one inlet for gases and two outlets, one at the lower part of the container to allow the condensed liquids to flow out, and the other for evacuating the gases.

As mentioned previously hereinabove, the level sensor is capacitive, acting as an electric condenser, the system therefore functioning based on the following physical principle:

When a dielectric is present between the plates of two conductors and a difference in potential is applied between these plates, the condenser takes on an electrical charge, and the capacity of this condenser is defined as the quotient between the charge of any of its frames and the difference in potential existing between the two:

$$C = \frac{q}{V_1 - V_2}$$

If this principle is applied to the proposed system, when liquid is present between the isolated probe and the casing of the metal container, the liquid serves as a dielectric, modifying the electrical capacity of the condenser system. An oscillating RC circuit will then provide a frequency signal proportional to the capacity of the system, and which is therefore proportional to the height of the liquid in the container. The output signal of this system is additionally proportional to the dielectric constant of the substance serving as a dielectric. Thus, the greater the difference in dielectric constant between the liquid and the gas located in the rest of the space of the container, the more output signal the system will generate.

These frequency signals are processed by a microprocessor, where they are received by means of a multiplexor, the microprocessor making the necessary calculations in terms of response coefficients to ready an analog output signal which can be interpreted by the control instruments, this typically being a 4/20 mA signal, proportional to the sensor response, which is, in turn, proportional to the height of liquid in the container and which is transmitted to a controller in charge of the level control of the liquid/gas separator system. The system can be calibrated by means of digital communications with a computer or by means of pushbuttons which select the frequency signals that will correspond to the maxim and minimum output signals.

In conjunction with the sensor, two electronic circuits which are at exactly at the same temperature work in parallel, with which, making use of the microprocessor for performing the calculations, the error due to the changes in temperature in the electronic circuit is offset, a sensor with a high degree of precision being obtained as the end result, even for systems with a very low dielectric constant.

DESCRIPTION OF THE DRAWINGS

To complete the description being provided herein and for the purpose of aiding toward a better understanding of the features of the invention, according to one example of a preferred embodiment thereof, a set of drawings is attached hereto as an integral part of the description showing the following for illustrative yet non-limiting purposes.

DETAILED DESCRIPTION OF THE INVENTION

Figure 1:
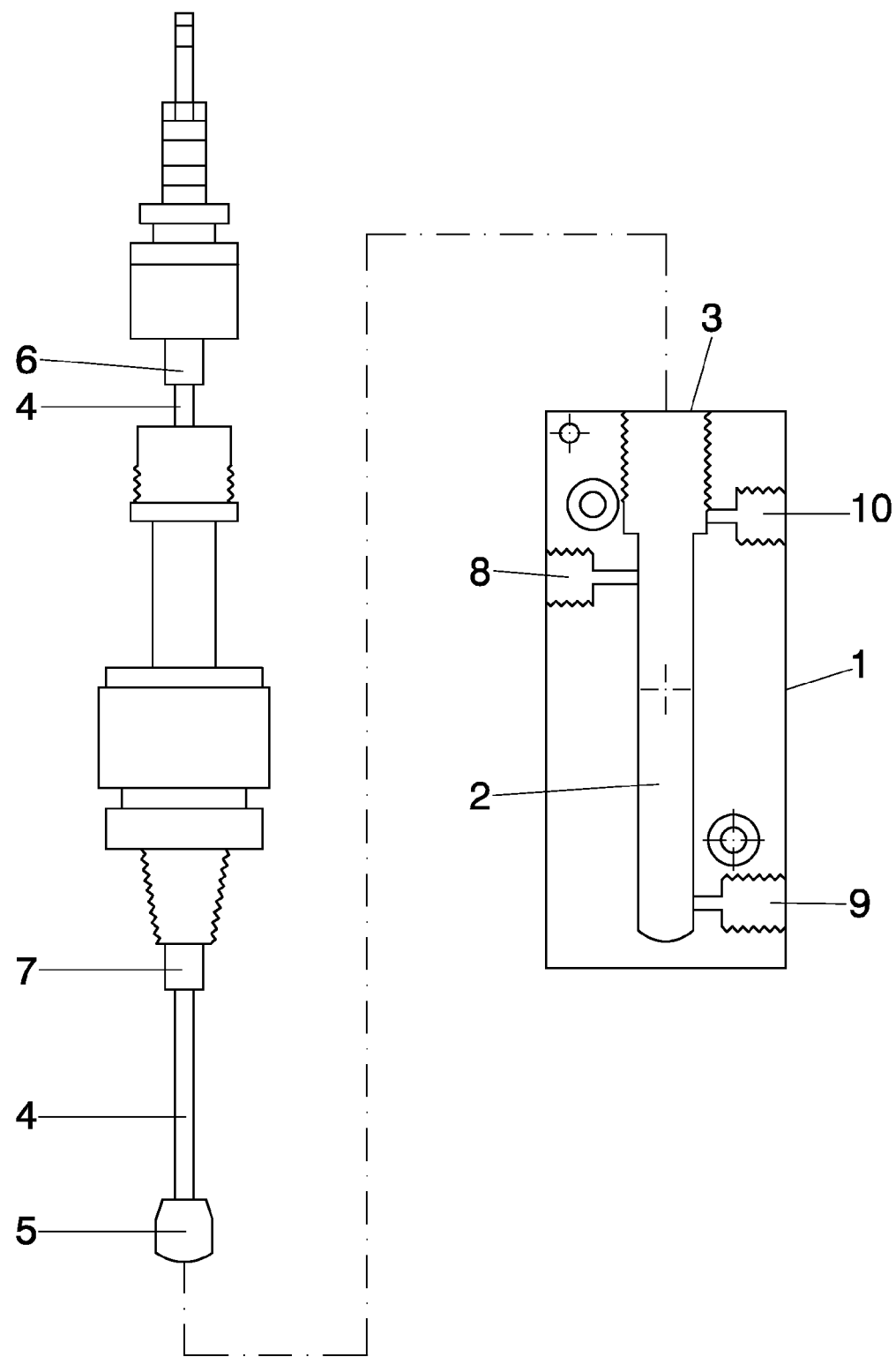
FIG. 1. illustrates a cross-section of an elevational view corresponding to the liquid/gas condenser with level sensor comprising object of the invention.

In view of the aforementioned figures, more specifically of FIG. 1, it is shown how the capacitive level sensor according to an embodiment of the invention is comprised of a solid metal part (1), made of stainless steel in this example, which has a borehole (2) comprising a container, and through the upper part of which a probe (4), electrically isolated from the rest of the system by elastomeric closures, chemically compatible and capable of withstanding high pressures of up to 400 bar, is inserted through the opening (3).

The special parallelepiped configuration of the part (1) makes the cooling thereof possible so that it will serve as a condenser, by means of a Peltier cell, such that on applying a difference in potential, a temperature differential of approximately 30° C. is generated between the plates. As a result of which the hot plate will raise its temperature up to 55° C. If a forced convection heat sink is used to lower the temperature of this plate to 25° C., then, so as to maintain a temperature differential of 30° C., the temperature of the cold plate must drop down to −5° C., and placed in contact with a metal block, a temperature on the order of 0° C. will be achieved in this block.

On the walls of the container (2), the liquids condense at high pressure and at a temperature of approximately 2° C. At the base of the container (2), the electric isolator (5) made of polytetrafluoroethylene and the probe (4), which, electrically isolated from the aforesaid container, is converted into one of the condenser plates, are collected.

The system has a number of parts referenced with (6) and (7), made of polytetrafluoroethylene, which are inside the assembly and which manage to eliminate the dead volumes from the system.

The separator with capacitive sensor which is shown in FIG. 1, has an inlet (8) for gases, including condensable gases, and two outlets one of those referenced as (9), located at the lower part of the container (2) for the evacuation of liquids; and the other, with reference (10) for evacuating gases, for example toward the pressure control of the system.

The gases enter the liquid/gas separator system with capacitive level sensor through the inlet (8), and once inside the container (2), as this container serves as a condenser, the liquids which are collected in the bottom of said container (2) are going to condense, such that as soon as a drop of liquid condenses, that variation in the level of the container (2) is detected by the probe (4), the liquid being evacuated through the outlet (9) by a control valve actuated by a level controller which receives the signal from the sensor. The uncondensed gases will flow out of the system through the outlet (10) of the part (1).

The liquid contained between the metal casing (1) and isolated probe (4), as has previously been stated herein, serves as a dielectric, modifying the electrical capacity of a condenser system such that, by means of two oscillating circuits, a frequency signal proportional to the capacity of the system and therefore to the amount of liquid accumulated in the container (2) will be transmitted.

Figure 2:
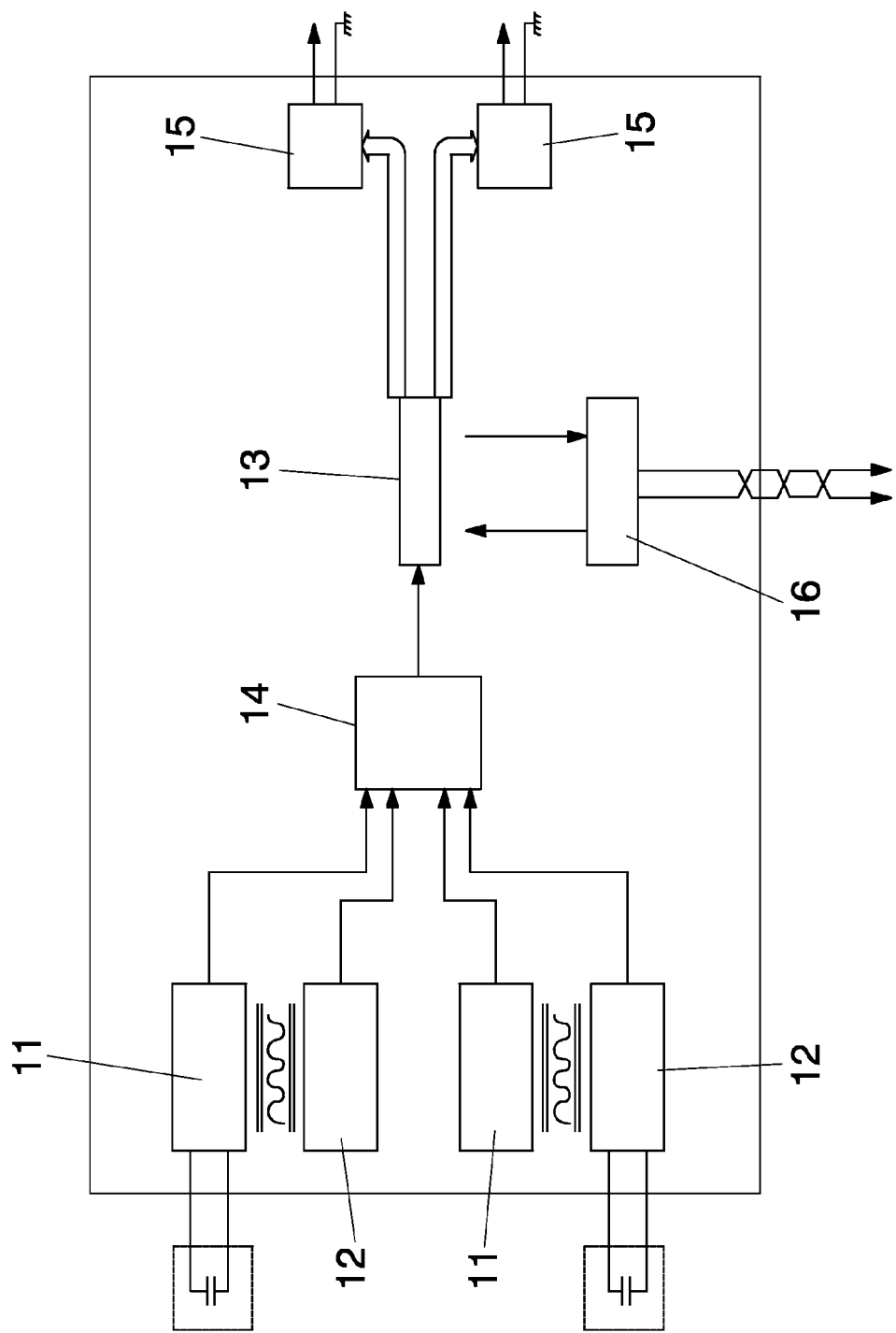
FIG. 2. is a block diagram showing the level reading system of the capacitive sensor according to an embodiment or the invention.

According to the block diagram provided in FIG. 2, there are two oscillating systems, one for measuring (11) and another for offsetting (12), identical for each one of the two circuits, which are located in close contact to thus perform the offsetting of temperatures of the oscillating circuit. The frequency signals from these systems are received in a microprocessor (13) by way of a multiplexor (14). The microprocessor (13) makes the calculations necessary for readying a type 4/20 mA output signal (15) proportional to the sensor response, which, in turn, is proportional to the height of the liquid in the container (2). The calibration of the system is performed by digital communications (16) with a computer or by pushbuttons which select the frequency signals corresponding to the maximum and minimum output signals, respectively of 20 mA and 4 mA.

It is important that the system be calibrated correctly in order to obtain measurements as reliable as possible, and to do so, with the electronic circuit described hereinabove and the sensor device, the following procedure applies:

With the liquid outlet (9) closed with a cap and the gas outlet (10) open to the atmosphere for venting the system, exact, known quantities of a compound are inserted through the gas and condensable inlet (8) using a graduated syringe, the needle of which is inserted into the inside of the container (2) in order to avoid meniscus phenomena at the inlet mouth. In a preferred embodiment of the invention, quantities of 0.5 cm$^3$ of ethanol have been inserted four times consecutively, accumulating a total of 2 cm$^3$ in the container (2).

Figure 3:
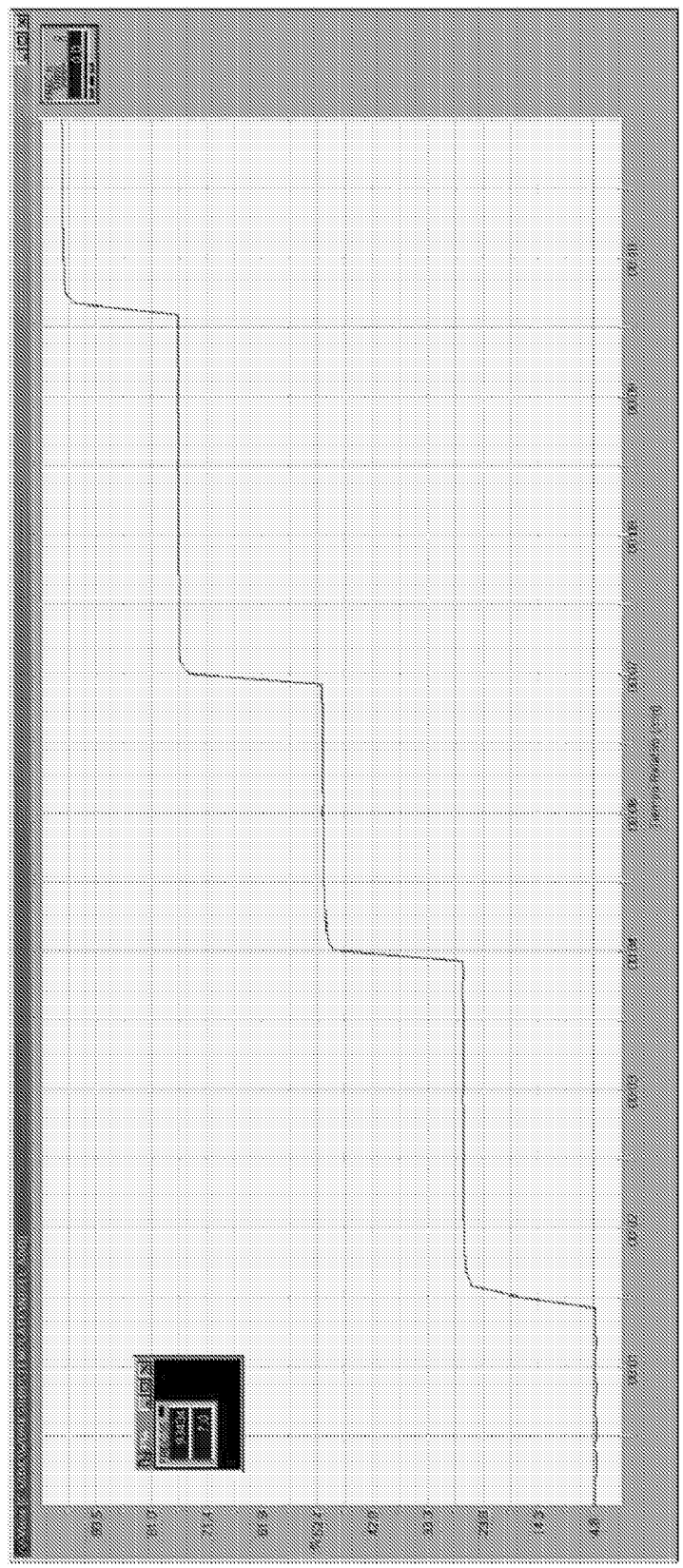
FIG. 3. is a graph showing the variation in the oscillating frequency of the capacitive level sensor comprising the object of the invention, when it is inserted into 0.5 cm$^3$ of ethanol four times consecutively.

FIG. 3 shows how the response in frequency changes with each addition of 0.5 cm$^3$ of sample in the described system. The frequencies which are displayed on the graph include a range from 30,000 Hz up to 51,000 Hz. The oscillation of the empty system is of 30,920 Hz and that of the system with 2 cm$^3$ of ethanol is 50,275 Hz, a change caused in the frequency response of the system of 19,355 Hz, for a compound with a relative dielectric constant of 25.3 at 25° C.

Figure 4:
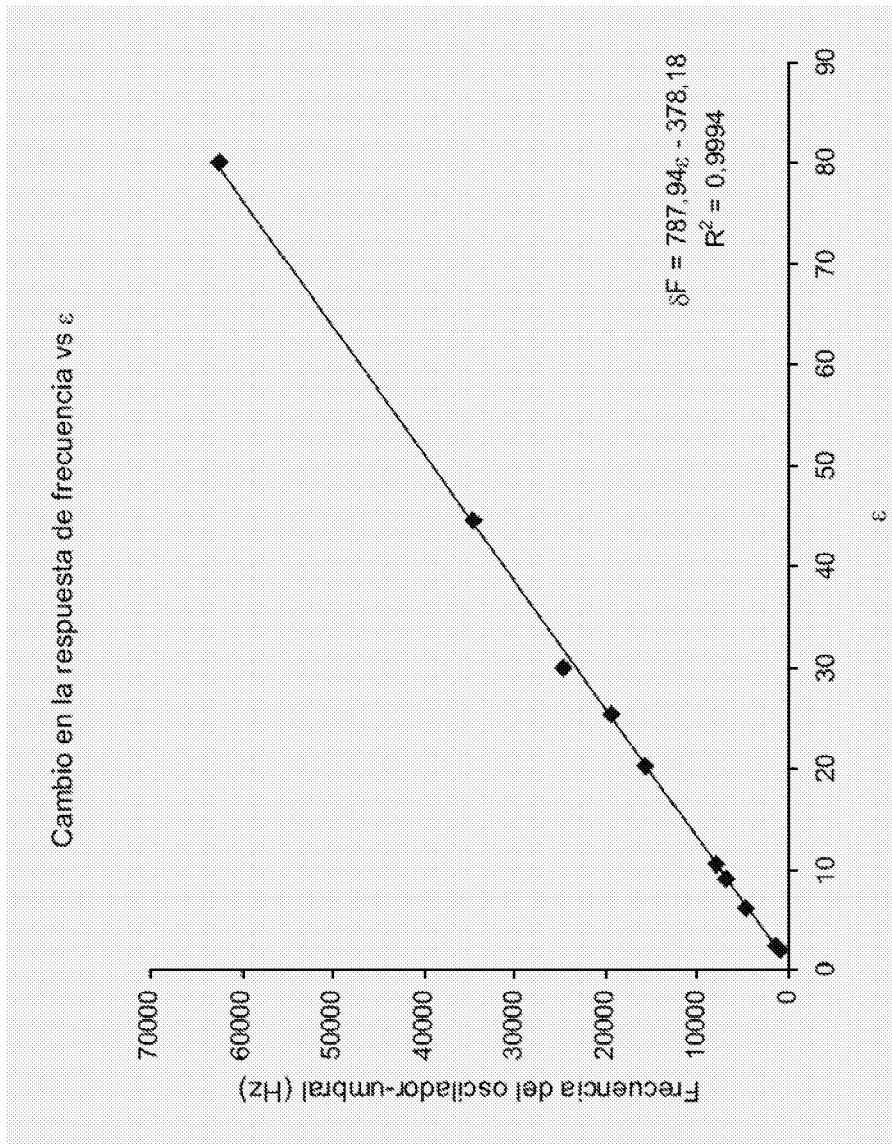
FIG. 4. is a graph showing the variation in the oscillating frequency with relative dielectric constant for 2 cm$^3$ of liquid.

The same experiment has been conducted for a certain number of compounds which encompass the full scale of dielectric constants, from 1.89 for hexane up to 80.1 for deionized water. The data for the four consecutive additions of 0.5 cm$^3$ and of the relative dielectric constants are shown in the following table:

Analyzing the relationship existing between the oscillation frequency of the level sensor and the relative dielectric constant thereof, the response is found to be extraordinarily linear for the entire scale of dielectric constants, as is shown in FIG. 4, which makes it possible to calculate the anticipated response for a certain compound in terms of the dielectric constant thereof.

The signal provided by the RC oscillator circuit (prior to be converted into a 4/20 mA analog signal) may vary between 31,000 and 90,000 Hz for water, between 31,000 and 50,000 Hz for alcohol and between 31,000 and 31,700 Hz for a hydrocarbon. In a situation such as this, a zero error of the instrument of, for example, 50 Hz is negligible in the case of fluids with a high dielectric constant, but is decisive in the case of the fluids with a low dielectric constant. Therefore, it is important to set the zero of the instrument with reasonable precision; and to do so, the system must be empty but have previously been moistened with the product to be measured. Once the zero of the instrument is known, it can be ensured that the output signal of the instrument is directly proportional to the height of the liquid in the container (2).

For control purposes, the microprocessor (13) converts the output signal into an analog signal (15) which can be interpreted by the control instruments. This is typically a 4/20 mA signal. For this purpose, it suffices to indicate to the instrument that 31,000 Hz corresponds to a 4 mA output and, for example, for ethanol, 50,000 Hz correspond to a 20 mA output. As of this point in time, the instrument provides a 4/20 mA output signal proportional to the height of the liquid in the container (2), with the exception of matters of geometric design.

The system described in the present invention has been used in a reactor for studying catalytic microactivity, in which when the reaction products evacuate the reactor, the liquids must then be separated prior to circulating through the pressure control valve. These liquids cannot access the pressure control system, since if they to do so, the performance of the control valve should be such as to allow these liquids to flow through. Hence continuous openings and closing due to the need of rapidly varying the valve flow coefficient would cause a pulsating piston flow circulation throughout the reactor. Furthermore, it is customarily advantageous for the good reproducibility of the analytical techniques to perform the liquid/gas separation prior to transporting the reaction products, for example, to a chromatograph. If the reactors work at atmospheric pressure, the extraction of the condensed liquids in the separator could be performed manually by an operator.

| COMPOUND | BASE | 0.5 cc | 1 cc | 1.5 cc | 2 cc | DIF | (20°) | FORM. |
|---|---|---|---|---|---|---|---|---|
| Hexane | 30923 | 31118 | 31314 | 31516 | 31710 | 787 | 1.89 | $C_6H_{14}$ |
| Heptane | 30930 | 31115 | 31330 | 31540 | 31730 | 800 | 1.92 | $C_7H$ |
| Hexadecane | 30960 | 31198 | 31438 | 31679 | 31914 | 954 | 2.05 | $C_6H_{34}$ |
| Hydraulic oil | 30970 | 31225 | 31522 | 31815 | 32062 | 1092 | | |
| Mechanical oil | 30988 | 31280 | 31595 | 31897 | 32170 | 1182 | | |
| Carbon tetrachloride | 30955 | 31225 | 31512 | 31790 | 32060 | 1105 | 2.24 | $Cl_4$ |
| Toluene | 30935 | 31245 | 31590 | 31923 | 32244 | 1390 | 2.379 | $C_7H_8$ |
| Vegetable oil | 30985 | 31435 | 31922 | 32403 | 32808 | 1823 | | |
| Acetic acid | 30940 | 32005 | 32260 | 34511 | 35512 | 4572 | 6.17 | $C_2H_4O_2$ |
| Dichloromethane | 30920 | 32503 | 34191 | 36000 | 37715 | 6795 | 9.08 | $CH_2Cl_2$ |
| 1,2-Dichloromethane | 30918 | 32790 | 34945 | 37128 | 38900 | 7982 | 10.42 | $C_2H_4Cl_2$ |
| Isopropanol | 30945 | 34645 | 38808 | 43000 | 46525 | 15580 | 20.18 | $C_3H_8O$ |
| Ethanol | 30920 | 35710 | 40800 | 46060 | 50275 | 19355 | 25.3 | $C_2H_6O$ |
| Methanol | 31632 | 37800 | 45200 | 51542 | 56210 | 24578 | 30 | $CH_4O$ |
| Glycerol | 31377 | 40840 | 49470 | 57786 | 65853 | 34458 | 44.52 | $C_3H_8O_3$ |
| Deionized water | 31000 | 45810 | 63020 | 78745 | 93420 | 62420 | 80.1 | $H_2O$ |
| Drinking water | 31000 | 51015 | 77665 | 109800 | 145700 | 114700 | | $H_2O$ |

But this is not possible for a piece of equipment which is operating at a pressure higher than atmospheric pressure, given that the loss of the hydraulic seal of the liquid products in the base of the separator would allow a major leakage of gases into the atmosphere, possibly causing an accident. Each of these problems is solved by placing, prior to the outlet of the gases through the pressure control valve, the liquid/gas separator with level sensor incorporated, which condenses the compounds which have a low boiling point, which will be evacuated form the system in real time as they are progressively deposited onto the separator. This evacuation must be continuous if analysis is intended of these liquid products to provide sensitive information regarding the evolution of the process. Inlet liquid flow rates ranging from 0.05 ml/m to 5 ml/m have been employed to full satisfaction.

The capacitive level sensor has also be successfully used in a plant for supercritical extraction with backflow column. At the base of this column, there is a container in which the liquids used up after their circulation through the extraction column are collected; and this container is at a pressure of 400 bar, the volume thereof being approximately 200 cm$^3$. The nature of the medium present in the system is supercritical $CO_2$ and the different liquids which descend toward the container can be of very different types: mineral oils, vegetable oils, tomato waste products, milk waste products, etc.

Another application of this system is level measurement in autoclaves, in other words, in vessels agitated at high pressures which are small-sized, having a capacity of 50 ml to 1000 ml, for the regulation of the level of the liquid when a liquid is continuously proportioned into the system and the output signal of the sensor governs a valve for the liquid outlet.

The invention claimed is:

1. An electric capacity level sensor with a high degree of precision for micro-volume systems, comprising:
    a metal part or casing, having walls, an opening and a borehole closed at the bottom thereof so as to constitute a container having walls, a lower part and a bottom;
    at least one inlet for gases;
    a first outlet disposed at the lower part of the container, the first outlet being an outlet for liquids;
    a second outlet, the second outlet being an outlet for gases,
    a probe; and
    a capacity level sensor having an oscillating RC circuit and a second electronic circuit, the oscillating RC circuit being a measuring circuit and the second electronic circuit being an offsetting circuit,
    wherein:
    the metal part or casing operates as a condenser with the aid of a Peltier cell cooling system, the Peltier cell cooling system being in contact with the walls of the casing, thus allowing liquids to condense on the walls of the container, and to be collected in the bottom of the container;
    wherein the probe is configured to be inserted through the opening of the metal part or casing and into the container, the probe is electrically isolated from the remainder of the metal part or casing and is capable of withstanding pressures up to 400 bar, and the probe constitutes, in conjunction with the metal part or casing, an electric condenser system, such that liquid present between the probe and the metal part or casing operates as a dielectric capable of modifying the electrical capacity of the electric condenser system;
    wherein the oscillating RC circuit is configured to provide a frequency signal proportional to the electrical capacity of the condenser system, the electrical capacity of the condenser system being proportional to a height of the liquid in the container;
    wherein the second electronic circuit is configured to operate at exactly the same temperature as the oscillating RC circuit;
    wherein the second electronic circuit is configured to provide a frequency signal proportional to the electrical capacity of the condenser system, and the second electronic circuit is configured to work in parallel with the oscillating RC circuit; and
    wherein the frequency signals from the oscillating RC circuit and from the second electronic circuit are received in a microprocessor through a multiplexor, and the microprocessor is configured to perform calculations so as to enable measuring errors due to changes in temperature in the oscillating RC circuit to be offset, and the microprocessor is configured to perform calculations for an output signal proportional to the frequency signals from the oscillating RC circuit and from the second electronic circuit, the output signal of the microprocessor being proportional to the height of the liquid in the container.

2. The electrical capacity level sensor for micro-volume systems according to claim 1, wherein the liquid condenses on the walls of the container at high pressures and at a temperature of between −2° C. and 20° C.

3. The electrical capacity level sensor for micro-volume systems according to claim 1, wherein the at least one inlet for gases is disposed in an upper part of the container.

4. The electrical capacity level sensor for micro-volume systems according to claim 1, wherein the metal part or casing is a solid parallelepiped.

5. The electrical capacity level sensor for micro-volume systems according to claim 1, wherein the probe is equipped with a plurality of pieces of insulating material which are configured to guide the probe and to eliminate dead volumes from the system.

6. The electrical capacity level sensor for micro-volume systems according to claim 1, wherein variation in the level of the liquid in the container is detected by the probe of the capacitive level sensor and wherein there is a level controller in the electrical capacity level sensor which receives the output signal from microprocessor, and the level controller actuates a control valve to evacuate the liquid through the first outlet.

7. The electrical capacity level sensor for micro-volume systems according to claim 5, wherein the pieces of insulating material which are configured to guide the probe and to eliminate the dead volumes from the system are formed from polytetrafluoroethylene.

* * * * *